United States Patent [19]

Mosher et al.

[11] Patent Number: 4,688,654
[45] Date of Patent: Aug. 25, 1987

[54] LEVELLER FOR PRODUCT FEEDER IN WEIGHING MACHINE

[75] Inventors: Oren A. Mosher, Hayward; Edward P. Stone, Oakland; Oren G. Mosher, Hayward, all of Calif.

[73] Assignee: Package Machinery Company, East Longmeadow, Mass.

[21] Appl. No.: 841,578

[22] Filed: Mar. 20, 1986

[51] Int. Cl.[4] ............................................. G01G 19/22
[52] U.S. Cl. ................................. 177/25; 177/DIG. 11
[58] Field of Search ........................ 177/25, DIG. 11; 222/238

[56] References Cited

U.S. PATENT DOCUMENTS

| | | | |
|---|---|---|---|
| 3,939,929 | 2/1976 | Hidaka et al. | 177/121 |
| 4,418,771 | 12/1983 | Henry et al. | 177/25 X |
| 4,421,185 | 12/1983 | Koto et al. | 177/25 |

Primary Examiner—George H. Miller, Jr.
Attorney, Agent, or Firm—McCormick, Paulding & Huber

[57] ABSTRACT

A levelling apparatus for a combination weighing system comprises a first, rotating tine assembly supported adjacent to a vibrating feed chute to rake product, a second, stationary tine assembly supported adjacent to the first tine assembly so that as tines of the first tine assembly revolve about a tine assembly axis the tines of the first tine assembly interdigitate with tines of the second tine assembly to strip product from the first tine assembly and participate in the levelling process. The first tine assembly is pivotally supported to a guide means which leads from the chute to an accumulator bucket so that the first tine assembly does not interfere with vibrations of the feed chute and is pivotally moveable away from the chute to facilitate servicing of the chute.

5 Claims, 6 Drawing Figures

LEVELLER FOR PRODUCT FEEDER IN WEIGHING MACHINE

BACKGROUND OF THE INVENTION

The invention relates generally to weighing systems and deals more particularly with an apparatus for levelling product while being fed to a container for subsequent weighing, which apparatus may be combined with a combination weighing machine.

A previously known combination weighing system comprises a vibrating dome or inverted cone which receives product from an input conveyor located above it. The product is dumped onto the dome, and the vibrations cause it to slide by gravity down the sides of the dome. A plurality of vibrating chutes which are downwardly inclined from the base of the dome guide the product to an equal number of temporary storage containers or time-fill buckets. Each of the time-fill buckets receives a charge of the product at a relatively slow rate and then dumps the charge instantaneously into a weighing hopper of a weighing scale. There, the charge is weighed and considered in a subsequent combination search aimed at locating a combination of the scales which yields a total weight at or slightly above a target weight.

The angle of incline of the vibrating chutes, the amplitude and duration of the vibrations of the chutes and the characteristics of the product influence the feed rate to the time-fill buckets. The range of quantities of product which are deposited in the time-fill buckets determines the typical number of scales which are combined to yield the target weight. For example, if the target weight is 80 grams and 15 to 25 grams of product are deposited in each time-fill bucket and subsequently into the associated weighing scales, then the product in 3-5 weighing scales will ordinarily be combined to yield the target weight. With this range of product in each weighing scale, there are a large number of possible combinations of scales which conceivably may yield the target weight and this large number provides a very accurate weighing system. If there were substantially more product in each scale than the 15-25 gram desired range, then there would be fewer viable combinations of scales which will conceivably yield a combined weight near to the target weight so that the accuracy of the system on the average will decline. Consequently, it is desirable to provide charges of product in the aforesaid range.

A problem has arisen in the feeding of certain types of products which tend to clump. One example is looseleaf chewing tobacco which tends to clump because of its inherent stickiness and the elongated, irregular shapes of the leaves which tangle with one another. Another example is lollipops which are also inherently sticky and have stems and wrappers which may catch one another. Still another example is frozen clam strips which tend to clump because of the inherently sticky surface of the strips and their elongated shape.

Focusing on the looseleaf chewing tobacco application, as the tobacco is fed along a vibrating chute of a combination weighing system, the product may clump to a height of 12 centimeters even though the desired and normal height of the product on the chute is only 2-3 centimeters. Such clumps may weigh 50-100 grams, and in the aforesaid application where the package target weight is 80 grams, the weight of one clump alone in a weighing scale may prevent the scale from participating in a combination, degrade the accuracy of the combination weighing system, and increase the incidence of lock-up, a condition in which no combination of scales meets the weight range criteria.

Previously, a rotating tine assembly has been installed above the input conveyor to provide some control over the height of the product on the input conveyor and its feed rate onto the vibrating dome. The assembly comprises a plurality of tines mounted in rows to a common shaft. The shaft is rotatably mounted to a bracket which bracket is fixedly mounted in place. The tips of the tines may be curved and periodically pass over the product on the input conveyor close enough to engage relatively high clumps of the product but far enough to miss the product when traveling at a normal height. The assembly rotates counter to the movement of the product on the coveyor belt so that the tines rake back the peaks of the clumps. Occasionally, a clump is so high that the tines lift it and catapult it over the assembly downstream of the assembly. While this assembly provides some control over the height of product and resultant feed rate, improvements are deemed necessary to provide a finer control on the product height and feed rate. Also, certain types of products such as looseleaf chewing tobacco tend to stick to the tines and adjacent portions of the weighing system and improvements are deemed necessary to provide easier means for cleaning the tines and adjacent portions of the weighing system. Moreover, much of the clumping results from the dropping of product from the input conveyor onto the vibrating dome and such clumps cannot be dissipated by the aforesaid tine assembly when mounted above the input conveyor.

A general object of the present invention is to provide an apparatus for controlling the height of a product subject to clumping in a product feed assembly and the resultant feeding rate more accurately than previously provided.

A more specific object of the invention is to provide an apparatus of the foregoing type which controls the feed rate from a vibrating chute of a combination weighing machine to a time-fill bucket.

Another general object of the present invention is to provide an apparatus of the foregoing type which does not impede access to adjacent portions of the product feed assembly.

DETAILED DESCRIPTION OF THE PREFERRED EMBODIMENTS

Figure 1:
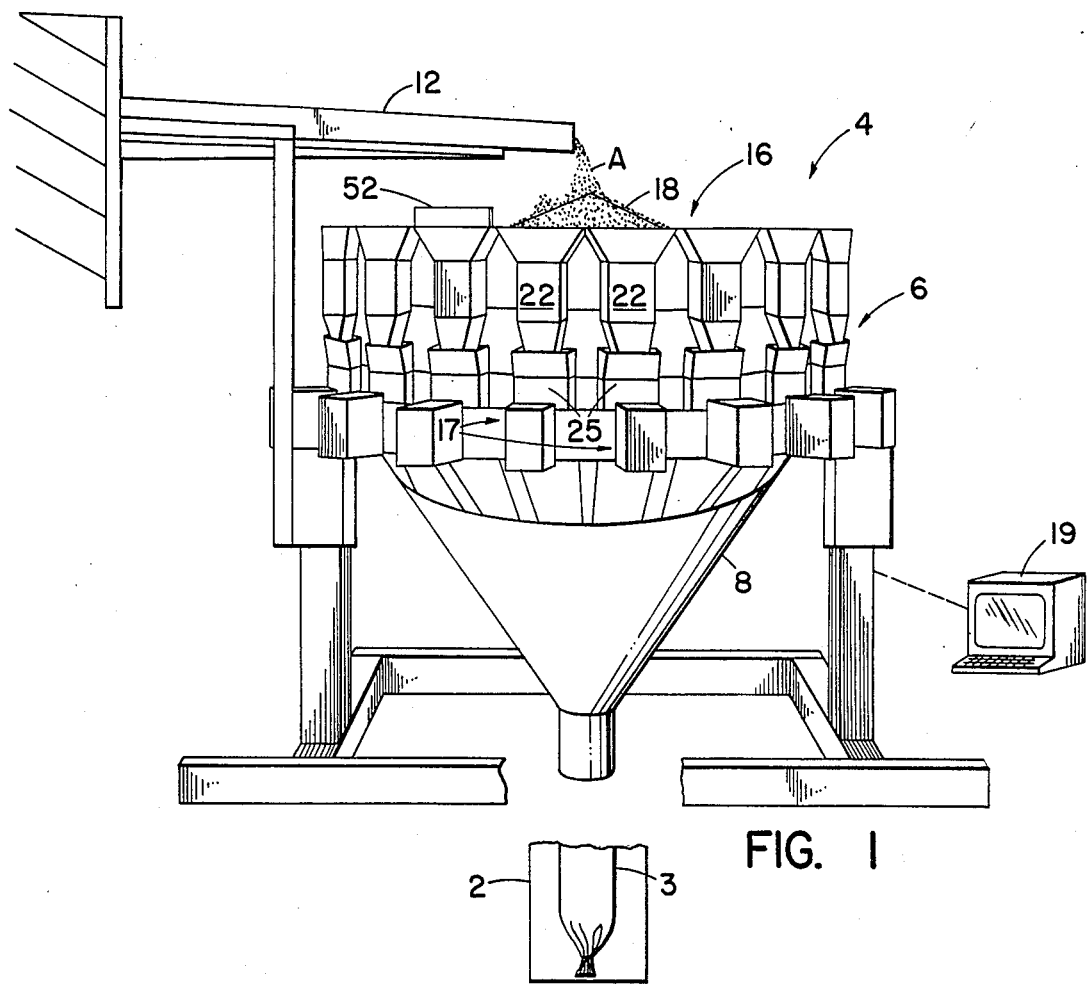
FIG. 1 is a frontal perspective view of a combination weighing system in which the invention is embodied.

Turning now to the drawings, FIG. 1 illustrates a combination weighing system generally designated 4, in which the invention is embodied. The system 4 includes a combination weighing machine 6 and an input conveyor 12 which feeds product A to the weighing machine 6. By way of example, the product A comprises looseleaf chewing tobacco which is inherently sticky and subject to clumping. The weighing machine 6 includes weighing scales 17,17, accumulator or time-fill buckets 22,22 and a product feed assembly 16. The product is delivered by the conveyor 12 to the product feed assembly which in turn delivers it to the time-fill buckets 22,22. Occasionally the time-fill buckets dump the accumulated product into the weighing scales. A computer controller 19 monitors weight signals produced by the weighing scales 17,17 and searches for combinations of the scales which satisfy weight range criteria for a package. A combination searching method is disclosed in U.S. Pat. No. 4,466,500 to Mosher, et al, which patent issued Aug. 21, 1984, is assigned to the assignee of the present application and is hereby adopted by reference as part of the present disclosure. The weighing machine 6 also includes a common discharge chute 8 which receives product dumped from selected scales 17,17 to fill a package 3 through a form fill and seal machine 2 or other packaging machine.

Figure 2:
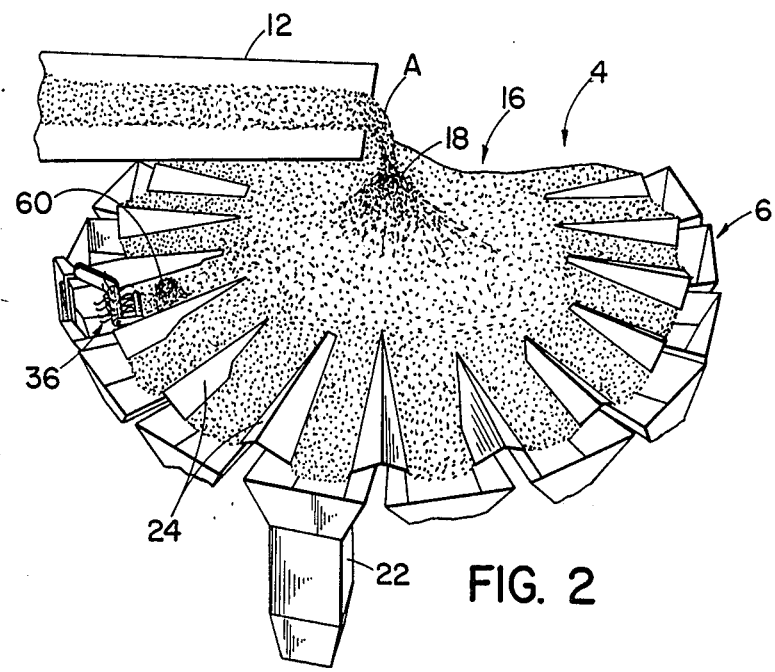
FIG. 2 is a fragmentary perspective view of the combination weighing system of FIG. 1 as viewed from the top-front.

As shown in FIG. 2, the feed assembly 16 includes a dome-shaped vibratory feeder 18 (also shown in FIG. 1) located beneath the discharge end of the conveyor 12. Vibrating chutes 24,24 lead in a downward incline from the vibratory dome feeder 18 to respective time-fill buckets 22,22. The time-fill buckets serve to collect the product A at a relatively slow rate and later transfer it at a fast rate to weighing containers 25,25 of the associated weighing scales 17,17.

The vibrations of the dome 18 and the chutes 24,24 facilitate the movement of the product A to the respective time-fill buckets 22,22 and provide means for controlling the rate of movement so that a quantity of product within a predetermined range of weight is deposited into the respective time-fill buckets 22,22. This predetermined range of weight determines the typical numbers of scales which are combined to yield the target weight of the package 3. For example, if the package target weight is 80 grams, and it is desired that the contents of 3-5 scales be selected to form the contents of a single package, then the duration and magnitude of vibrations of the chutes 24,24 are adjusted so that approximately 15-25 grams (mean weight of 20 grams) of product are fed into each time-fill bucket 22 for later transfer to the associated weighing scale 17. As noted above, a primary reason that 3-5 scales are desired to form the contents of a package is to provide a large number of possible scale combinations which may combine to meet the weight range criteria; many more combinations than if the scales were filled such that only 1 or 2 scales were typically combined. Moreover, with the 3-5 scale grouping, it is rare that a scale waits for very long to be included in a combination so that the product in tne time-fill buckets and weighing hoppers does not become stale. After the time-fill buckets 22,22 have been loaded with product, the vibrations of the associated chutes are usually terminated to prevent further delivery of product to the respective time-fill buckets until the time-fill bucket is emptied into the weighing scale below.

Focusing now on the present invention, FIG. 2 shows a levelling apparatus 36 associated with one of the vibrating chutes 24. However, it should be understood that in the complete machine 6, one such levelling apparatus 36 is associated with each of the chutes 24,24 so that in the machine 6 where there are 16 weighing scales, 16 time-fill buckets 22,22 and 16 vibrating chutes 24,24, there is a total of 16 levelling apparatus 36,36 even though only one leveling apparatus 36 is illustrated.

The levelling apparatus 36 serves to break up clumps 60,60 of the product A while being fed from the associated chute 24 to the time-fill bucket 22 to provide a more uniform feed rate of the product A to the time-fill bucket 22 and more control on the amount of product which is fed into the time-fill bucket 22. By way of example, the desired level of product fed along the chute 24 may be 2-3 centimeters while some of the clumps 60,60 reach a height of twelve centimeters. The clumps 60,60 may be formed in a variety of ways; they may exist when the product is delivered to the conveyor 12, when it is dumped from the conveyor 12 onto the dome 18 by the impact of the product with other product and with the dome and during feeding along the dome 18 and the chutes 24,24.

Figure 4:
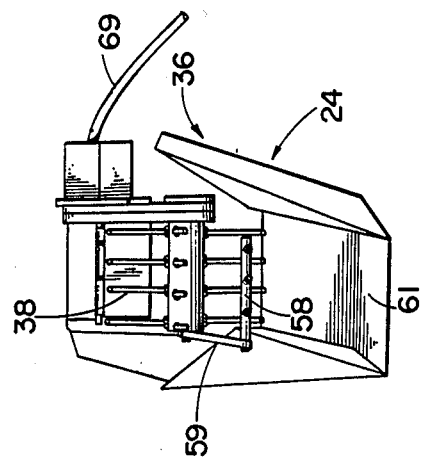
FIG. 4 is a front view of the levelling apparatus of FIG. 3 in the lowered position of FIG. 3.
Figure 5:
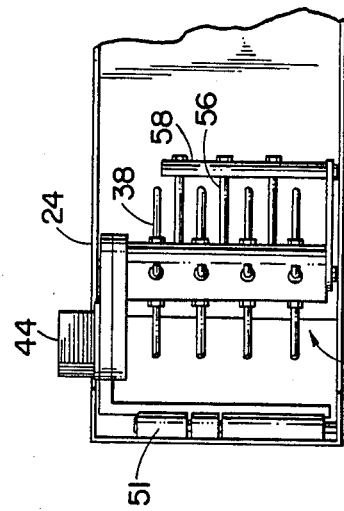
FIG. 5 is a top view of the levelling apparatus of FIG. 3 in the lowered position of FIG. 3.
Figure 3:
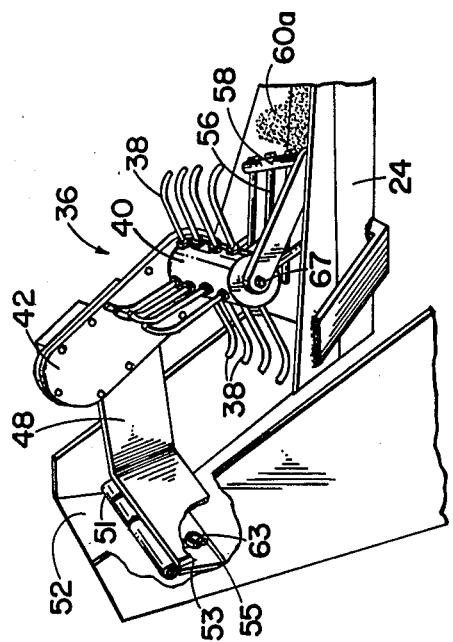
FIG. 3 is an enlarged perspective view of a levelling apparatus of the combination weighing system of FIG. 1 and shows the levelling apparatus in a lowered position in which it acts upon product being fed through the combination weighing system.
Figure 6:
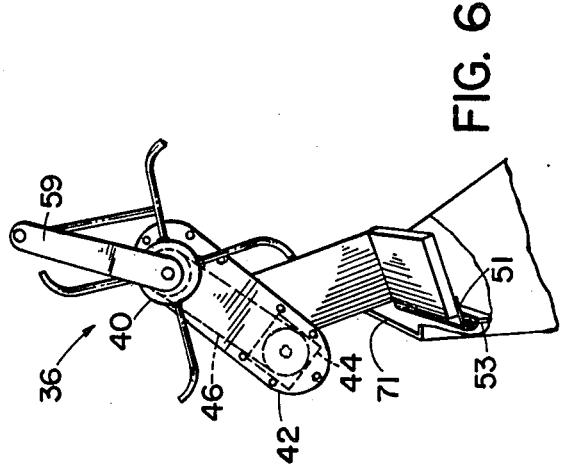
FIG. 6 is a side view of the levelling apparatus of FIG. 3; however, in FIG. 6 the levelling apparatus is shown in an elevated position.

As shown more clearly in FIGS. 3-5, the levelling apparatus 36 comprises four sets of tines 38,38, four tines per set, which tines are fixedly mounted to a common shaft 40 to form a tine assembly. The shaft 40 is carried by an arm 42 and rotates in a counterclockwise direction by a motor 44 acting through a belt 46 (FIG. 6) such that the tines 38,38 tend to rake clumps of the product A back up the chute. The motor may be a DC or stepping variety, the latter providing more control over the motion of the tines. The motor 44 is attached to an end of the arm 42 opposite the shaft 40. The arm 42 is attached to a bracket 48 which bracket is pivotally attached by a hinge 51 to an end guide 52 leading to and supported by a time-fill bucket 22. The guide 52 comprises a generally vertically extending, trough-shaped chute which extends to a level above the tines 38,38 when the tines project upwardly so that if the tines 38,38 happen to carry any product over the shaft 40, it will be guided into the time-fill bucket 22. One hasp 53 of the hinge 51 has vertical slots 55,55 (FIG. 6) through which pass bolts 63,63 for connecting the hinge 51 to the guide 52. The vertical slots 55,55 allow the height of the rotating tine assembly to be set relative to a desired product feed height in the chute 24.

The levelling apparatus 36 also includes stationary tines 56,56 slightly upstream of the shaft 40 relative to the direction of product flow along the chute 24. The tines 56,56 are fixedly attached to a bar 58 such that the tines 56,56 lie in a plane approximately parallel to a floor 61 of the chute 24 which plane is slightly inclined from the horizon. The bar 58 traverses much of the chute 24 and is supported by an arm 59, which arm is attahced by a bolt 67 to a stationary end fitting of the shaft 40. By loosening the bolt 67, the height of the bar 58 and tines 56,56 may be adjusted to suit the particular product and desired feed rate. The revolving times 38,38 interdigitate with the stationary tines 56,56 as the tines 38,38 revolve. In keeping with the product height example given above,the stationary tines 56 and bar 58 lie approximately seven centimeters above the floor 61 of the chute 24 and when projecting downwardly, the tines 38,38 extend to within five centimeters of the floor 61.

As shown in FIG.3, a clump 60a moves along the chute 24, which clump has a height in excess of the level of the stationary bar 58. When the clump 60 reaches the stationary bar 58, the top portion of the clump is temporarily halted by contact with the stationary bar 58 and the lower portion of the clump proceeds downstream along the chute (right to left in FIG. 3) due to the vibrations and incline of the chute 24. As the lower portion of the clump 60a passes under the stationary bar 58 and within reach of the revolving tines 38,38, the lower portion is raked backward or upstream by the tines 38 levelling the clump 60a.

The horizontal tines 56,56 and the stationary, transverse bar 58 serve at least three important functions in the levelling process. The revolving tines 38,38 drive the clumped product against the stationary tines 56,56 which brace the product of the clump while the revolving tines 38,38 pass through the interstices between the stationary tines 56,56 and thereby divide the clump. Also, the stationary tines 56,56 strip the product engaged by the revolving tines 38,38 to prevent most, if not all of such engaged product from getting carried over the shaft 40 and dumped into the respective time-fill bucket 22. Such product, if allowed to be dumped in this manner into the time-fill bucket 22, would increase the load in the time-fill bucket and may cause the load in the bucket 22 to exceed the desired weight range. It should also be noted that end portions 64,64 of the tines 38,38 are curved away from the oncoming product so that the tines can slice through the product without catching much of it. In addition to supporting the stationary tines 56,56, the stationary bar 58 serves as a barrier to slow the advance of the top portions of relatively high clumps while the revolving tines 38,38 break up the foundation of the clumps. The barrier function provided by the stationary bar 58 is desirable for some applications but for others, it may be more desirable to provide the stationary bar 58 at a higher level and angle the stationary bars 56,56 downwardly in the downstream direction so that more if not all of the clumps can pass under the stationary bar 58 and then pass under upstream portions of the stationary tines 56,56 while the revolving tines 38,38 break up the clumps and level the product on the chute 24. In this orientation, downstream portions of the stationary tines 56,56 serve to temporarily halt the clumps while they are broken up and also to strip product from the revolving tines 38,38.

The looseleaf chewing tobacco like many sticky products which are fed along the chutes 24,24 adheres to the chutes so that the chutes require frequent cleaning, one or more times per hour. The levelling apparatus 36 may also require periodic cleaning. To facilitate the cleaning of the chutes 24,24 and the levelling apparatus 36, an overhanging portion of the levelling apparatus comprising the tines 38,38, the shaft 40, the arm 42, the motor 44, and the bracket 48 may be pivoted upwardly to the position shown in FIG. 6. At this position, the portion of the chute 24 which lies below the levelling apparatus and also the tines 38,38 and 56,56 are easily accessible for cleaning or other servicing. Because the motor 44 pivots with the shaft 40, the drive coupling between the motor and shaft remains intact. A power and control cable 69 leads from the controller 19 to the motor 40 and is inherently flexible enough to tolerate the pivotal motion of the motor 44. The hinge 51 allows enough of a rearward pivot so that the center of gravity of the overhanging portion of the levelling apparatus is rearward of the hinge axis and therefore, the overhanging portion of the levelling apparatus rests at the position shown in FIG. 6 against a top, rearward lip 71 of the guide 52.

By the foregoing, a levelling apparatus for a vibrating chute of a weighing system has been disclosed. However, numerous substitutions and modifications may be made without deviating from the scope of the invention. For example, a different number of revolving or stationary tines may be provided. Also, the speed of the motor 44 may be controlled by the controller 19. Also, if desired, a pivotal connection between the arm 42 and bracket 48 may be provided such that the arm 42 rests at the position shown in FIG. 3 by a limit of the pivot mechanism but is free to pivot upwardly for servicing. Therefore, the invention has been disclosed by way of illustration and not limitation.

We claim:

1. In a combination weighing machine having a vibratory feed dome, a plurality of accumulator containaers, a plurality of vibrating chutes for feeding product from said feed dome to the accumulator containers, and a plurality of weighing scales which weigh product received from said accumulator containers respectively, the improvement comprising;

levelling means associated with a first one of the vibrating chutes for levelling product en route to the respective accumulator container, said levelling means including a first plurality of tines and means for revolving said tines about an axis of rotation adjacent to said first chute such that said tines rake said product as said product is fed along said chute; and a second plurality of tines and means for supporting said second plurality of tines in fixed relation to the axis of rotation and adjacent said first plurality of tines and said first chute such that said first plurality of tines interdigitate with said second plurality of tines as said first plurality of tines revolve about said axis to strip product from said first plurality of tines.

2. In a combination weighing machine as set forth in claim 1 said first plurality of tines being supported in fixed relation to one another to form a tine assembly and said levelling means further including means for pivotally supporting said tine assembly such that said tine assembly is moveable from the aforesaid position adjacent to said first chute to a second position further from said first chute to facilitate servicing of said first chute.

3. In a combination weighing machine as set forth in claim 2, said levelling means further comprising a vertically extending guide for guiding product from said first chute to the associated accumulator container and means for supporting said guide without interfering with the vibration of said first chute and the pivotal support means being mounted between said guide and said tine assembly.

4. A weighing apparatus comprising:

receptacle means for temporarily containing product, a chute for feeding product to said receptical means, means for supporting said chute on an incline and vibrating said chute to cause product to slide by gravity down said inclined chute and into said receptacle means, a first plurality of tines supported in fixed, spaced relation to one another, a first means for revolving said first plurality of tines about an axis adjacent to said chute to rake back clumps of product which are fed along said chute, a second plurality of tines supported in fixed, spatial relation to one another adjacent to said first plurality of tines and said chute such that said first plurality of tines interdigitate with said second plurality of tines as said first plurality of tines revolve about said axis to strip product from said first plurality of tines.

guide means for guiding product from the discharge end of said chute to said receptacle means, said guide means projecting upwardly from said receptacle means, means for moveably supporting said first plurality of tines from said guide means such that said first plurality of tines is moveable from a first rest position adjacent to said chute where said first plurality of tines engage clumps of product on said chute to a second position away from said chute to facilitate access to said chute.

5. A weighing apparatus as set forth in claim 4 wherein said axis is transverse and parallel to a floor of said feed chute.

* * * * *